(12) United States Patent
Jenner

(10) Patent No.: US 10,117,385 B2
(45) Date of Patent: Nov. 6, 2018

(54) METHOD AND APPARATUS FOR SELECTIVE PHOTOMORPHOGENESIS IN PLANTS

(71) Applicant: Thomas Jenner, Seattle, WA (US)

(72) Inventor: Thomas Jenner, Seattle, WA (US)

(*) Notice: Subject to any disclaimer, the term of this patent is extended or adjusted under 35 U.S.C. 154(b) by 690 days.

(21) Appl. No.: 14/381,408

(22) PCT Filed: Mar. 1, 2013

(86) PCT No.: PCT/US2013/028703
§ 371 (c)(1),
(2) Date: Aug. 27, 2014

(87) PCT Pub. No.: WO2013/131024
PCT Pub. Date: Sep. 6, 2013

(65) Prior Publication Data
US 2015/0121753 A1 May 7, 2015

Related U.S. Application Data

(60) Provisional application No. 61/605,431, filed on Mar. 1, 2012.

(51) Int. Cl.
*A01G 29/00* (2006.01)
*A01G 7/04* (2006.01)

(52) U.S. Cl.
CPC ............ *A01G 7/045* (2013.01); *Y02P 60/146* (2015.11)

(58) Field of Classification Search
CPC ...... A01G 7/045; A01M 21/046; A01M 21/04
USPC ...................................... 47/58.1 IS
See application file for complete search history.

(56) References Cited

U.S. PATENT DOCUMENTS

| | | | |
|---|---|---|---|
| 6,795,568 B1 * | 9/2004 | Christensen | A01M 21/04 250/559.29 |
| 7,875,862 B1 * | 1/2011 | Hudson | A01M 21/04 250/492.1 |
| 8,872,136 B1 * | 10/2014 | Jackson | A01M 21/00 250/492.1 |
| 9,060,468 B2 * | 6/2015 | Klase | F21V 5/007 |

(Continued)

FOREIGN PATENT DOCUMENTS

| | | | |
|---|---|---|---|
| EP | 2848121 A1 * | 3/2015 | ........... A01D 34/015 |
| JP | 9-131133 A | 5/1997 | |

(Continued)

OTHER PUBLICATIONS

International Search Report and Written Opinion dated Jun. 24, 2013, issued in corresponding International Application No. PCT/US2013/028703, filed Mar. 1, 2013, 11 pages.

(Continued)

*Primary Examiner* — Kristen C Hayes
(74) *Attorney, Agent, or Firm* — Christensen O'Connor Johnson Kindness PLLC

(57) ABSTRACT

Disclosed is a method and apparatus for selective photomorphogenesis of plants by directly illuminating the plant stem or other plant structures using various wavelengths of light and various light sources. The methods and apparatus disclosed can be used in commercial agriculture, plant breeding research programs, genetically engineered plant research and development programs or anytime a plant grower desires to maximize the volumetric efficiency or reduced the height of a plant.

17 Claims, 10 Drawing Sheets

(56) References Cited

U.S. PATENT DOCUMENTS

| | | | |
|---|---|---|---|
| 2004/0230102 A1* | 11/2004 | Anderson, Jr. | A01G 7/045 600/231 |
| 2005/0281027 A1* | 12/2005 | Capen | A01G 7/045 362/231 |
| 2008/0120736 A1 | 5/2008 | Hurst | |
| 2009/0114210 A1* | 5/2009 | Guice | A01M 21/04 126/569 |
| 2009/0199470 A1* | 8/2009 | Capen | A01G 7/045 47/58.1 LS |
| 2012/0218750 A1* | 8/2012 | Klase | F21V 5/007 362/231 |
| 2016/0205917 A1* | 7/2016 | Chan | A01M 21/046 |
| 2017/0099826 A1* | 4/2017 | Paoluccio | A01M 21/02 |

FOREIGN PATENT DOCUMENTS

| | | | |
|---|---|---|---|
| JP | 2001-95376 A | 4/2001 |
| JP | 2006-197924 A | 8/2006 |
| JP | 2008-142005 A | 6/2008 |
| JP | 2011-45286 A | 3/2011 |

OTHER PUBLICATIONS

Poudel, P.R., et al., "Effect of Red- and Blue-Light-Emitting Diodes on Growth and Morphogenesis of Grapes," Plant Cell, Tissue and Organ Culture 92(2):147-153, Feb. 2008.

* cited by examiner

METHOD AND APPARATUS FOR SELECTIVE PHOTOMORPHOGENESIS IN PLANTS

CROSS-REFERENCE TO RELATED APPLICATION

This application claims the benefit of U.S. Provisional Patent Application No. 61/605,431, filed Mar. 1, 2012, the disclosure of which is incorporated herein by reference in its entirety.

FIELD OF THE INVENTION

The disclosed invention relates to the manipulation of plant growth for agriculture, medical plants, and other research and development plant programs or commercial plant application and production.

BACKGROUND

Plants, over millions of years, have evolved a number of responses to their environment to include responses to low light levels and plant crowding. In response to both low light levels and plant crowding, most plants will respond with increased stretching of their internodal length in their stems in an attempt to out compete their neighboring plants. This stretching behavior is useful in a plant's natural environment because plants that stretch their stems tend to receive more light than their neighboring plants. This greater lighting level increases that plant's chances of spreading its seed and thus propagating itself.

This natural internodal stem stretching behavior can be a major disadvantage in cultivated plants, however, since in cultivated plants the grower typically wants as much yield in a given area or volume. There are chemical growth retardants for stem length reduction commercially available for some plant industries such as the floral industry; however, there are no chemical growth retardants that are approved for any food crop in a large number of countries including the United States. Some previously used growth retardants that were used for internodal length reduction in food crops, such as daminozide, are no longer used due to concerns that daminozide is a potential carcinogen.

The manipulation of light is also a known method for inhibiting and/or enhancing the growth of plants. The use of short-wavelength light (e.g., ultraviolet) is known to provide a small inhibition of growth when used as an ambient light source (e.g., when shone on the plant from above the canopy of leaves). However, the use of light has not heretofore been used to truly inhibit the growth of a plant as chemical growth retardants have.

Thus, no non-chemical method presently exists whereby plant size can be reduced, while maintaining the fruit yield of a traditionally sized plant.

SUMMARY

The invention presented provides a means of photomorphogenically manipulating plant growth (e.g., reducing internodal stem length) without using chemicals. This invention relates to a non-chemical method of decreasing the internodal length of plants by directly illuminating the plant stem with light (e.g., blue or ultraviolet).

The invention relates to monocotyledon ("monocot"), dicotyledon ("dicot"), hardwood, and softwood plants, as well as any other plants not identified by these broad terms.

To overcome the natural responses of plant internodal stem elongation due to low light levels or overcrowding, the application of light directly (unobstructed) onto the plant's stem is utilized. The light source is preferably of high intensity (e.g., located very close to the plant's stem). In one embodiment, the direct illumination of light on the plant stem has the effect of reducing the amount of plant hormones, particularly auxins and gibberellins, in the stem with a minimal reduction of plant hormones in other parts of the plant so that the plant can be closer to the size of a genetic dwarf plant while giving yields closer to that of a full size plant.

In an exemplary embodiment, blue or ultraviolet light-emitting diodes (LED) are used at the base of the plant or along side the stem of the plant to directly illuminate the plant's stem with blue or ultraviolet light.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The foregoing aspects and many of the attendant advantages of this invention will become more readily appreciated as the same become better understood by reference to the following detailed description, when taken in conjunction with the accompanying drawings.

The invention relates to the use of photomorphogenesis (i.e., light-controlled growth and/or development of plants). In certain embodiments, directed light is used to inhibit, enhance, or otherwise alter a portion of a growing plant, such that at least one characteristic of the grown plant is different than if the directed light had not been applied.

In the disclosure provided herein, a representative embodiment is primarily described that relates to the reduction of the internodal stem distance in a dicotyledon plant. It should be appreciated that the invention is not limited to such an embodiment, but can be used to control growth or development of all types of plants.

Figure 1:
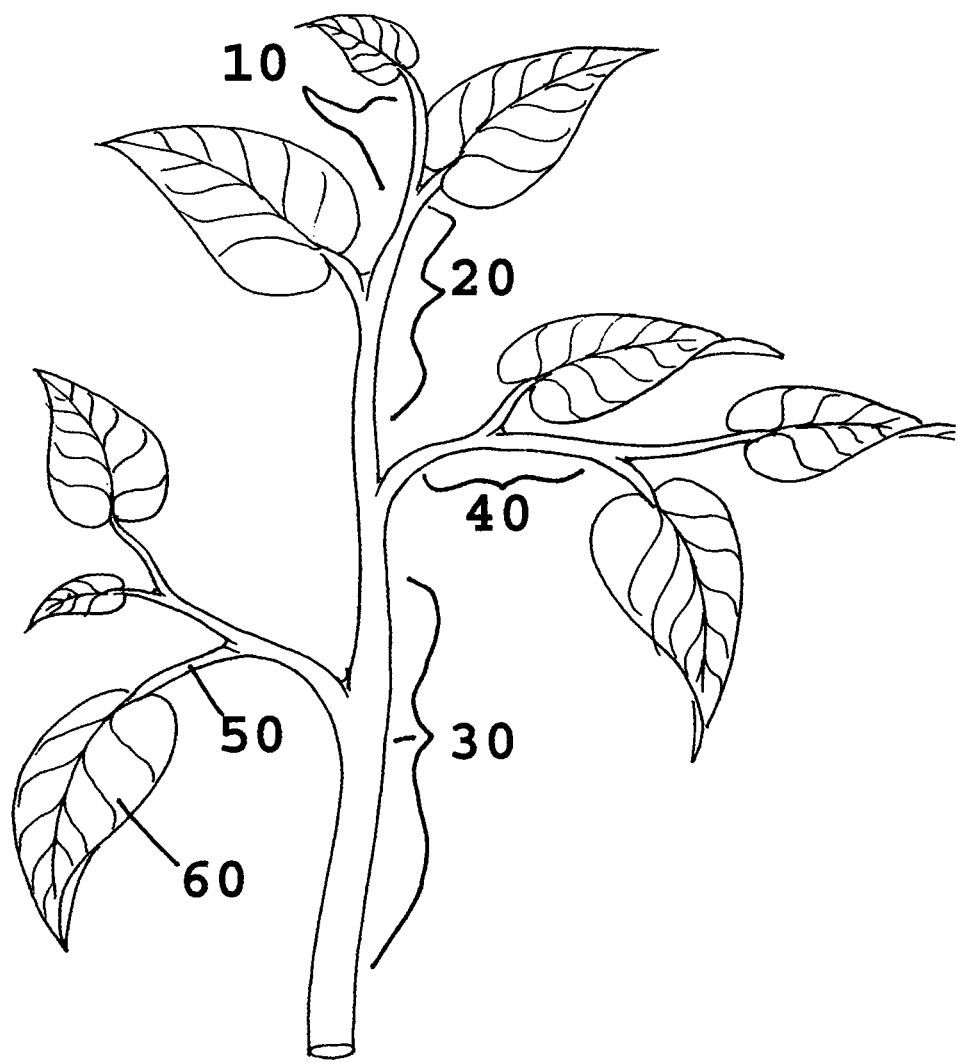
FIG. 1 is a generic drawing of a dicotyledon plant.

FIG. 1 shows a generic drawing of a dicotyledon plant. The area of the plant that is directly illuminated with blue or ultraviolet light is at the zone of division of the main stem (FIG. 1, number 10), zone of elongation of the main stem (FIG. 1, number 20) and the early zone of maturation of the main stem (FIG. 1, number 30) of the plant. For the purposes of this disclosure, the zone of maturation starts where the application of direct blue lighting no longer has a significant effect in reducing stem length. This will vary with different plant types. FIG. 1, number 40 represents a typical side shoot of a dicotyledon plant. A side shoot acts similar to the main stem with a zone of division, elongation, and maturation. FIG. 1, number 50 refers to the petiole of a leaf which is a small stalk that connects the leaf to a side or main stem. FIG. 1, number 60 represents leaf tissue. The leaf tissue is the main plant tissue used for photosynthesis. The internodal distance is the distance between side shoots 40 along the main stem of the plant.

Figure 2:
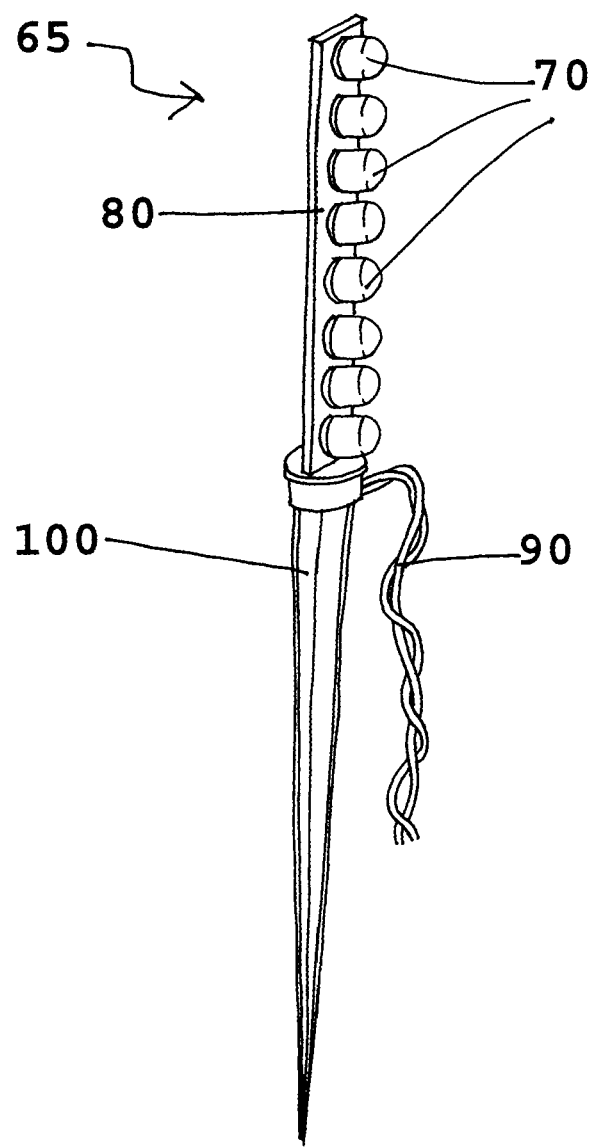
FIG. 2 illustrates an apparatus in accordance with the present disclosure.

FIG. 2 illustrates an apparatus 65 for use in the methods of plant stem length reduction disclosed herein. The apparatus 65 comprises a linear array of LEDs (e.g., blue LEDs, an exemplary light source). FIG. 2, number 70 refers to the blue LEDs. FIG. 2 number 80 refers to the LED circuit board and related housing. FIG. 2, number 90 refers to the LED power connector. FIG. 2, number 100 refers to the linear LED array-mounting unit. For example, in the illustrated embodiment, the linear LED array is mounted on a plastic spike 100 or any other mounting material that is intended to be inserted in or placed upon soil or any hydroponic medium. Different beam patterns can be generated with different LED configurations. For example, an oval 10 degree by 40 degree beam pattern can be generated to allow for a greater amount of light to strike the stem of a plant with overlap from other LEDs, while a round 20 degree beam pattern can allow for both the main stem of the side stems to be directly illuminated with blue light. Blue light (or blue LEDs) are referred to herein as a light source, but it will be appreciated that this is only an exemplary embodiment, and the invention is not limited to the use of blue light or blue LED lighting.

Figure 3:
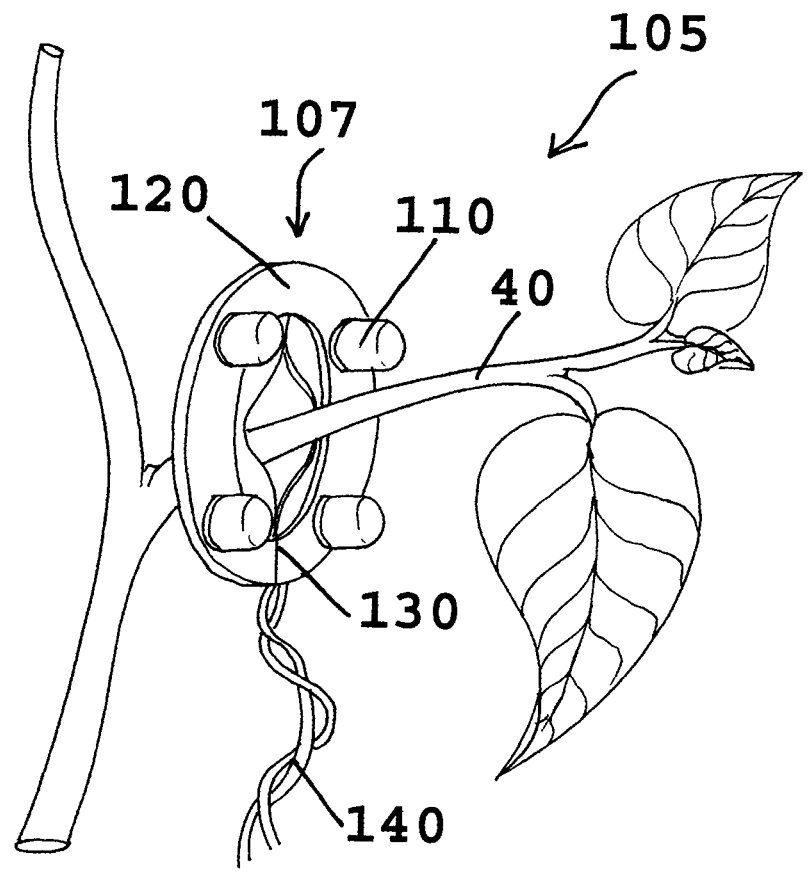
FIG. 3 illustrates an apparatus in accordance with the present disclosure.

FIG. 3 illustrates an embodiment of the invention, wherein a ring apparatus 107 is used for reducing the stem length of a genetic clone before the clone is taken from the genetic donor plant as discussed in more detail herein. FIG. 3, number 110 refers to LEDs. FIG. 3, number 120 is a clip-on housing. Other attachment means will be available, as known to one skilled in the arts, for attachment of the ring apparatus 107 to the main or side stem shown in FIG. 1, number 40. FIG. 3, number 130 is a slit in the housing so that the ring apparatus 107 may be taken on and off the plant's stem 40. The embodiment shown in FIG. 3 can also be used at the base of very young plants to keep the stem from elongating excessively. A power cord 140 provides power to the LEDs 110.

Figure 4:
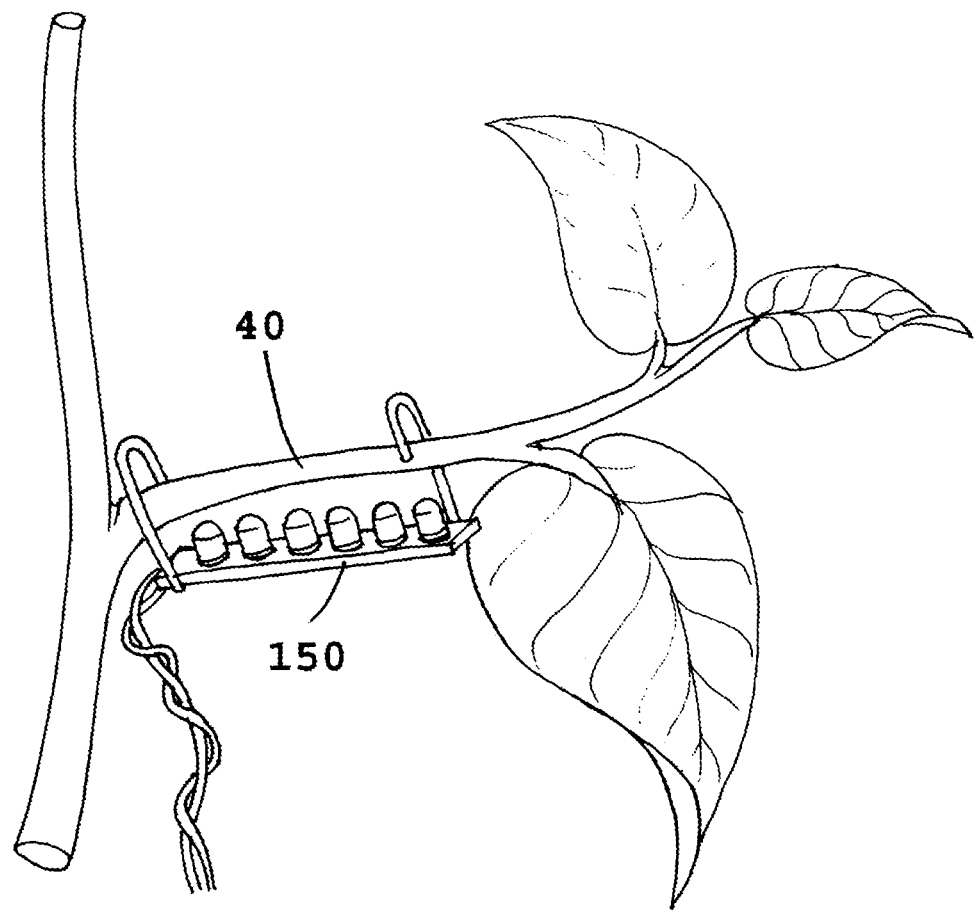
FIG. 4 illustrates an apparatus in accordance with the present disclosure.

FIG. 4 refers to an embodiment wherein using a single LED array 150 underneath a side stem 40 keeps the side stem from elongating. With some plants, the effects of phototropism have a stronger effect than gravitropism so the side shoot will grow in a downward direction. This has the effect of having stem reduction lights on both sides of the stem decreasing side stem length. The LED array 150 is similar in construction to the apparatus 65 illustrated in the embodiment of FIG. 2, numbers 70, 80 and 90, with hooks attached.

Figure 5:
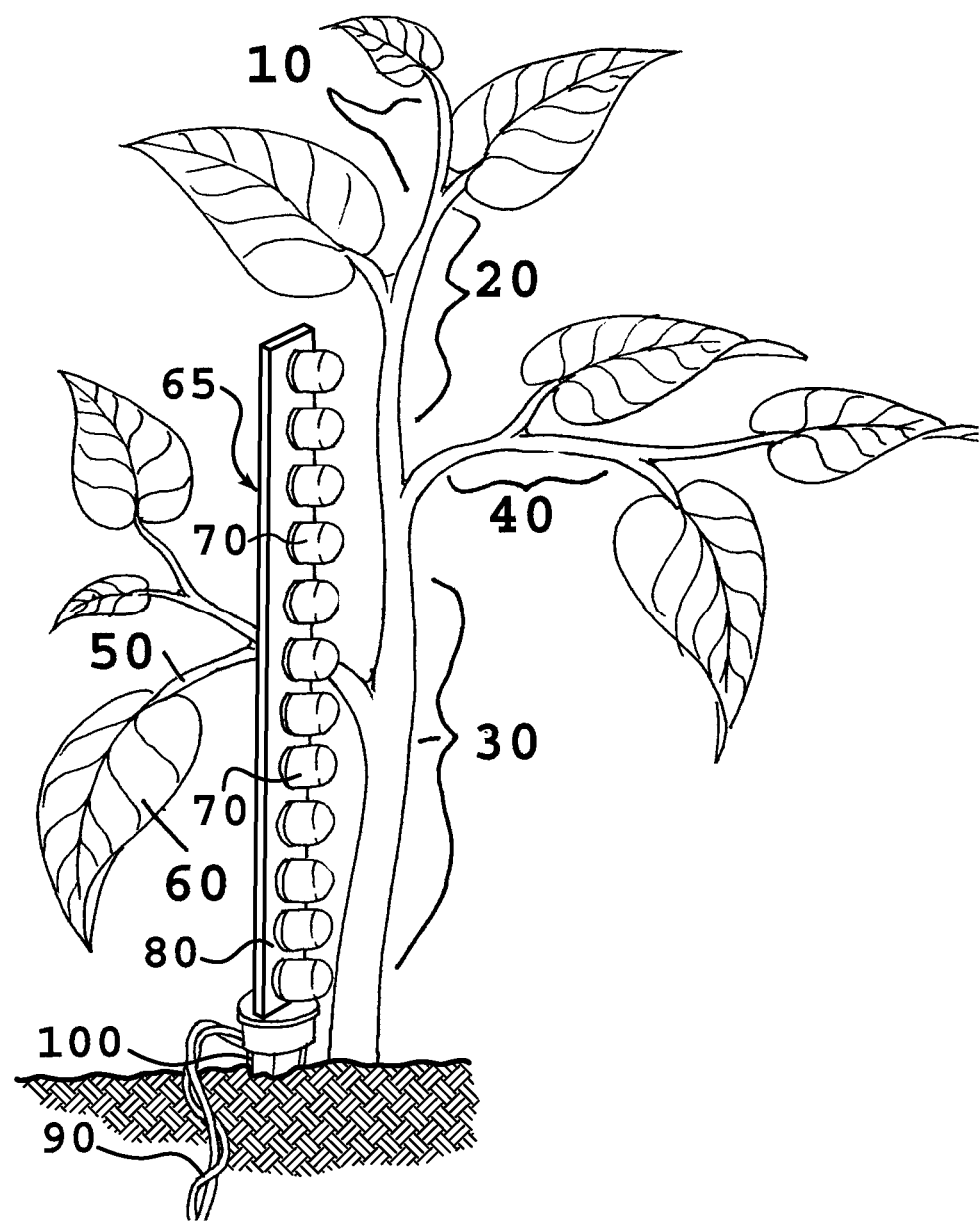
FIG. 5 illustrates an apparatus in accordance with the present disclosure.

FIG. 5 illustrates a representative embodiment of an apparatus of the invention wherein a stick apparatus 65 (similar to that of FIG. 2) is positioned to directly illuminate the main stem of a plant (similar to that of FIG. 1) with light from LEDs 70. Both the zone of maturation 30 and zone of elongation 20 are directly targeted with light. The power connector 90 can be connected directly to a power supply (e.g., wall, battery, solar cell) or can be routed through a centralized power source integrated into the growing container (not illustrated). For large-scale growth, growing containers having power supply points for lights used in the invention are contemplated so as to simplify the connection of lights to power and to reduce the clutter of power cords around the growing containers.

In one embodiment, the light source is adjustable (e.g., using the stick apparatus 65 or the ring apparatus 107) such that a specific portion of the growing plant stem is targeted with the direct lighting. For example, if the zone of elongation is the target portion of the plant stem for growth inhibition, as the plant grows taller, the stick apparatus 65 can be raised out of the soil to keep in direct optical communication with the zone of elongation. Similarly, for the ring apparatus 107, the desired portion can be targeted by sliding the ring apparatus 107 to bring the light into communication with the appropriate portion. Such adjustments can also be accomplished using automated systems to match the illumination of the light source with the desired portion of the growing plant targeted for growth inhibition.

Any light source known to those of skill in the art capable of producing light between 280 nm and 800 nm is useful in the provided embodiments. Such light sources include, but are not limited to: LEDs, electroluminescent strips, filtered fluorescent light, and the like. The light source may be pulsed or continuous wave. LEDs are an exemplary light source, as they are inexpensive, power efficient, and can be purchased with very specific wavelengths. While LEDs can be purchased with a specific wavelength specified (e.g., 450 nm light), the spectrum of an LED is not exclusively limited to the specified wavelength. For LEDs and all other lighting sources, when a specific wavelength is referred to herein, this represents a peak wavelength and not an exclusive wavelength. Filters and other optical components known to those of skill in the art can be used to further process and inhibit the spectrum of a light source as needed for a specific application.

An exemplary embodiment of the apparatus of the invention is to use a linear array of closely spaced blue LEDs such as shown in FIG. 2 with narrow round or oval beam patterns for the direct illumination of the stem of a monocotyledon or dicotyledon plant with high amounts of blue light. A linear array of blue LEDs with wide beam patterns may be used to directly illuminate both the main stem and the stems of side shoots or a combination of narrow beam pattern and wide beam pattern blue LEDs may be used. In an exemplary embodiment, the plant is directly illuminated on opposite sides of the stem for maximal efficiency of stem length reduction. Without directly illuminating both sides of a plant, the plant will tend to grow towards the blue light, resulting in a curved plant because the reduction in stem cell elongation will only occur in the presence of the blue light source.

As used herein, blue light is light having a wavelength of from about 450 nm to 500 nm. Violet light is light having a wavelength of from about 400 nm to 450 nm. Ultraviolet light (UV-A) is light having a wavelength from about 320 nm to 400 nm.

The embodiment of the invention may be designed as an integral part of a plant container to include hydroponic-style net pots or any other apparatus used to grow plants. For example, a dirt-based plant container having centralized power access for stem-illuminating lights.

Plants that have reduced stem length have applications for a wide range of commercial plant production methods. For example, in the case of apple trees, blue LEDs can be clipped onto on to a genetic donor apple tree (mother plant) in preparation of taking a cutting, so as to reduce the stem length of the cutting before being grafted to a root stock (see FIG. 3). The new grafting can then continue to be illuminated by blue or ultraviolet light on the stem. Reduced stem length cloning can be used with a wide variety of commercial tree crops so that the cuttings or grafts will not be long and lanky and allows for the potential dwarfing of a non genetic dwarf tree crop, which would save on labor costs during harvest and safer for the personal during harvesting since no, or shorter, ladders could be used. Because the genetics of the plant are not being changed, even though a plant has gone through a stem reduction process, the total yield of the fruit will be about the same of a plant that has not gone through a stem reduction process.

The method and apparatuses presented can be used in tissue-culture applications to keep plantlets more compact than compared to normal overhead fluorescent lighting.

The invention has wide application in the agriculture field. For example, transplant crops such as tomatoes can be started in a greenhouse under lower lighting levels without the normal stem elongation that would occur with lower lighting levels. Also, the blue LEDs can illuminate the plant's stem continuously at a minimal energy cost so that the normal stem elongation that will happen during darkness will not occur. This will allow transplant crops to be highly compact so that the greenhouse grower can grow more plants in a given space and to allow the option of growing plants to sexual maturity that might not otherwise be possible. This will permit longer-maturing crops to be grown in areas that have a shorter growing season such as northern countries or countries that have a shorter grow season due to seasonal extreme weather.

An example would be growing tomatoes in a far northern region (e.g., Siberia) that has about a 90-120 day frost-free grow season. Although there are strains of tomato that can be grown in this time period, they tend to be smaller and lower yielding varieties. By starting and growing larger and higher yielding varieties of tomatoes in a greenhouse while keeping them compact due to the light treatment of the invention, such regions can have a higher yield and wider variety of tomato crops.

The invention presented has applications in plant breeding and genetically engineered plant research and development. By directly illuminating the stem of plants with blue light, the plant researcher can gain an understanding of what a plant is genetically capable of in terms of internodal stem length. Some plants grown using the provided embodiments, such as "Kentucky Wonder" pole bean (*Phaseolus vulgaris*), have shown an excess of 90% internodal stem length reduction, as described further below with reference to Table 1. While the internodal stem length is reduced, the amount of fruit produced by the plant is not reduced. Thus, a very compact plant can be grown that will produce the same amount of fruit as a standard-sized plant.

Even plants that have known genetic mutations for dwarfism and reduced internodal stem length, such as the tomato strain "Micro Tom" (*Lycopersicon esculentum*), have shown an approximately 66% reduction in internodal stem length by the application of high amounts of blue light on the plant's stem.

The invention also provides a means to research the application of various wavelengths of light on the leaves, flowers, or fruit yield of plants without potentially increasing the length of the plant's stem. For example, high amounts of far red light (around 735 nm) is known to increase the amount of the growth hormone auxin in some plant tissue, thus making leaves, fruit and flowers larger than normal in some plants that exhibit this far red light sensitivity. This far red light will also cause excessive stem elongation which this invention can remedy.

The invention presented can allow for extra small bonsai type trees and novel bonsai tree growth.

The invention presented can be used for corn plants or other monocotyledons to reduce their flowering height. NASA researchers have recently presented research concluding that blue light has little effect on wheat, a monocot. The NASA researchers used only ambient, overhead lighting, however. When illuminating a plant with ambient lighting (e.g., from the top of the plant, one must consider the angle that the light impinges the stems from, as well as the shadows caused by upper leaves. In the present invention, the direct (unobstructed), intense blue lighting of the stem of the plant produces significant reduction in plant size for monocots, contradicting the accepted conclusions of the NASA researchers.

The invention presented can be used for plant photoperiodism research since intense blue light has been shown to be able to influence the circadian clock in some plants such as *arabidopsis thaliana*.

The invention allows one to grow with the petiole of plants (see FIG. 1, number 50) growing downwards since the petiole of plants tend to have a weak gravitropic response but a strong phototropic response allowing for novel plant morphology with potentially greater geometric photosynthesis efficiency. By having the plants leaves grow down, instead of out to the side, more plants can be grown in a given space. Furthermore, the photosynthesis rate, as expressed in amplitude of light, is non-linear and photosynthesis rates tends to have a higher total efficiency at lower lighting levels (peaking at 1000-1200 $\mu Mol/meter^2/sec$ ("$\mu Mol$"), which is half full sunlight). If leaves were grown downward at a 60-degree angle, for example, they would receive half the sunlight compared to if the leaf were perpendicular to the direction of sunlight. Because full sunlight has 2000 $\mu Mol$, only half of full sunlight is actually being used for photosynthesis. Growing leaves downwards in some plants, such as basil, is more than spatially efficient, it is also more optically efficient because all of the sunlight falling on the plant can be used at 1000 $\mu Mol$ lighting levels.

The invention presented can allow for tendril type plants to remain compact beyond the photomorphogenesis, due to the tendrils being in constant contact with other parts of the plant. The tendrils tend not elongate in a crowded grow environment due to a thigmomorphogenesis (touch) effect. Thus, plants can be grown that have an improved thigmomorphogenesis effect by utilizing the photomorphogenic methods disclosed herein.

The methods of the invention are chemical free and organic. Because growth retardants for food crops have been banned in the United States, at the present direct, uninterrupted blue light is the only feasible way of keeping plant stems of food crops short. Organic plant growers can selectively manipulate plant hormones with the invention presented while maintaining their commercial organic label.

The invention has application in a space program. For long term living in an environment where the cost of sending large amounts of food is cost prohibitive, such as a moon base where the cost of transporting material to the moon from the earth is about $50,000 per pound, the method and apparatus of the invention disclosed will allow greater amounts of food to be grown in a given volume since the plants will be more compact saving the costs of what would otherwise be a larger food biochamber.

Furthermore, direct application of the stem with blue light could help with stem elongation in a zero or low gravity environment. Plants stems have a strong gravitropism response, and in a zero or low gravity environment, plants will elongate due to not being able to sense which way is up. The invention can be used to solve this problem by allowing a grower to selectively inhibit plant growth.

The invention has application in the field of hobby indoor plant growing. A fundamental problem of growing plants indoors under artificial lighting is the increased internodal stem length associated with some popular indoor lighting sources such as high pressure sodium (HPS) lighting due to the low amounts of blue light in HPS lighting. Also, some popular indoor lights, such as linear fluorescent lighting, lack the intensity to prevent excessive internodal stem length elongation. The invention disclosed solves these stem length problems.

The invention allows for the possibility of increasing photosynthesis efficiency through increased gas exchange in plant tissue. It is well know in the art that blue light has a significant effect on the opening of the stomata of plants. A side effect of having blue light on the stem of a plant is that some of the blue light will spill over that strikes the bottom of leaves causing the stomata to widen more than normal regardless of photosynthesis rate. This will allow for the possibility of increase gas exchange with lower lighting levels in the leaf tissue (carbon dioxide, oxygen, and water vapor) and thus possibly allow for a higher photosynthesis rate that is normal.

The invention may be powered by a solar cell based or other alternative energy power system with the appropriate battery and power conditioner allowing for remote operation.

The invention presented can be used to control flowering initiation. Directed blue light on the leaves (or spill-over light from stem illumination) can decease the time it takes for some plant's to enter its flowering phase, as has been shown the long day plant *arabidopsis thalania*, a model plant and a member of the mustard family.

Experimental results will now be presented so as to further illustrate the dramatic improvements in plant growth provided by the invention. Table 1 provides growth data for exemplary plants grown using the method and apparatus of the invention compared to similar plants grown using standard growth methods.

TABLE 1

Stem Length Reduction Comparison Between Plants Grown Using the Method of the Invention and Traditionally Grown ("Control") Plants.

| PLANT | INVENTION (Inches) | CONTROL (Inches) | REDUCTION |
|---|---|---|---|
| Kentucky wonder pole bean (internodes) | 0.4 | 6 | 93% |
| Sweet corn (height to 3rd internode) | 2 | 4.5 | 56% |

TABLE 1-continued

Stem Length Reduction Comparison Between Plants Grown Using the Method of the Invention and Traditionally Grown ("Control") Plants.

| PLANT | INVENTION (Inches) | CONTROL (Inches) | REDUCTION |
|---|---|---|---|
| Sweet corn (height of 1st side shoot) | 1.5 | 4 | 53% |
| Tomato - Super Sweet 100 (internodes) | 0.3 | 1 | 70% |
| Tomato - Micro Tom (final height) | 3 | 7 | 57% |
| Dwarf Pea (2 week height) | 2.2 | 4 | 45% |
| Sweet Basil (internodes) | 1 | 3 | 67% |
| Average height reduction | | | 64% |

The plants of the invention in Table 1 were grown with direct blue light of 300-500 micromolar intensity.

Typical duration times were for 24 hours of direct light during early vegetative growth for all plants, and 18-20 hours for flowering in long-day plants. Although no results for short day (12 hour) plants are presented, the invention has been used to produce similar results in these plants.

Control plant growing conditions were illumination under a fluorescent broad-spectrum light at about 300 µMol.

The direct light used to decease internodal length can be removed as desired by the grower, and the duration of exposure will be plant dependent. If maximum size reduction is desired, then illumination for the growing life of the plant can be used. If only partial reduction is desired, light can be removed after the plant has been inhibited for only a portion of the grow life. In an exemplary embodiment, the light is removed after about 6 weeks of growth for a Kentucky Wonder pole bean from seed.

An estimate of the improvement in volumetric efficiency, as defined if the plants were placed in a cube, for a number of exemplary plants is presented in Table 2.

TABLE 2

Volumetric Efficiency Comparison Between Plants Grown Using the Method of the Invention and Traditionally Grown Plants.

| Plant | Height (Inches) | Width (Inches) | Thickness (Inches) | Volume (Cubic Inches) | Increased Efficiency |
|---|---|---|---|---|---|
| Sweet Corn - Control | 12 | 14 | 2 | 336 | — |
| Sweet Corn - Invention | 8 | 9 | 105 | 108 | 3.1 |
| Micro Tom - Control | 7 | 6 | 9 | 378 | — |
| Micro Tom - Invention | 3 | 7 | 4 | 84 | 4.5 |
| 2 Week Old Dwarf Pea - Control | 4 | 5 | 2 | 40 | — |
| 2 Week Old Dwarf Pea - Invention | 2.2 | 3 | 2 | 13.2 | 3 |

In Table 2, the increased efficiency represents the amount of volume decreased using the method of the invention compared to traditional techniques. For example, the monocot Sweet Corn is reduced in volume 3.1 times when grown using the method of the invention while retaining the same fruit yield. Similarly, the dicot Micro Tom tomato is reduced 4.5 times in volume while retaining the same fruit yield.

Regarding the growth of Micro Tom tomatoes, this species is believed to be the smallest tomato variety commonly available today. The invention has been used to grow a reduced-size Micro Tom that is believed to be the smallest fruiting tomato plant ever grown.

An exemplary method for Micro Tom growth will now be described. The plant was grown with about 300 µMol of blue LED light directly applied on either side of the plant's stem as soon as the hypocotyledons opened. The blue stem lights were left on 24 hours per day. Broad-spectrum ambient lighting was on the plant for 20 hours per day. A fully-grown plant measures three inches in height and produces about 50 tomatoes at a given time.

Figure 6:
FIG. 6 is a photograph of a side-by-side comparison of a (dicot) dwarf pea plant grown in accordance with the present disclosure (right) and using standard ambient lighting (left).

FIG. 6 is a photograph of a side-by-side (same grow time, different lighting) comparison of a (dicot) dwarf pea plant grown using the invention (right) and using standard ambient lighting (left).

Figure 7:
FIG. 7 is a photograph of a side-by-side comparison of a monocot Sweet Corn plant grown in accordance with the present disclosure (left) and using standard ambient lighting (right).
Figure 8:
FIG. 8 is a photograph of a side-by-side comparison of a Micro Tom tomato plant grown in accordance with the present disclosure (left) and using standard ambient lighting (right).

Standard ambient lighting in FIGS. 6-8 is a 500 µMol fluorescent broad-spectrum light source.

FIG. 7 is a photograph of a side-by-side (same grow time, different lighting) comparison of a monocot Sweet Corn plant grown using the invention (left) and using standard ambient lighting (right).

FIG. 8 is a photograph of a side-by-side (same grow time, different lighting) comparison of a Micro Tom tomato plant grown using the invention (left) and using standard ambient lighting (right). Grow time is 60 days. It is believed that this is the smallest fruiting tomato plant ever grown using chemical or non-chemical methods. Note the similar number of combined tomatoes and flowers on both plants, even though the plant grown using the invention is a fraction of the height and volume of the traditionally-grown plant.

Figure 9:
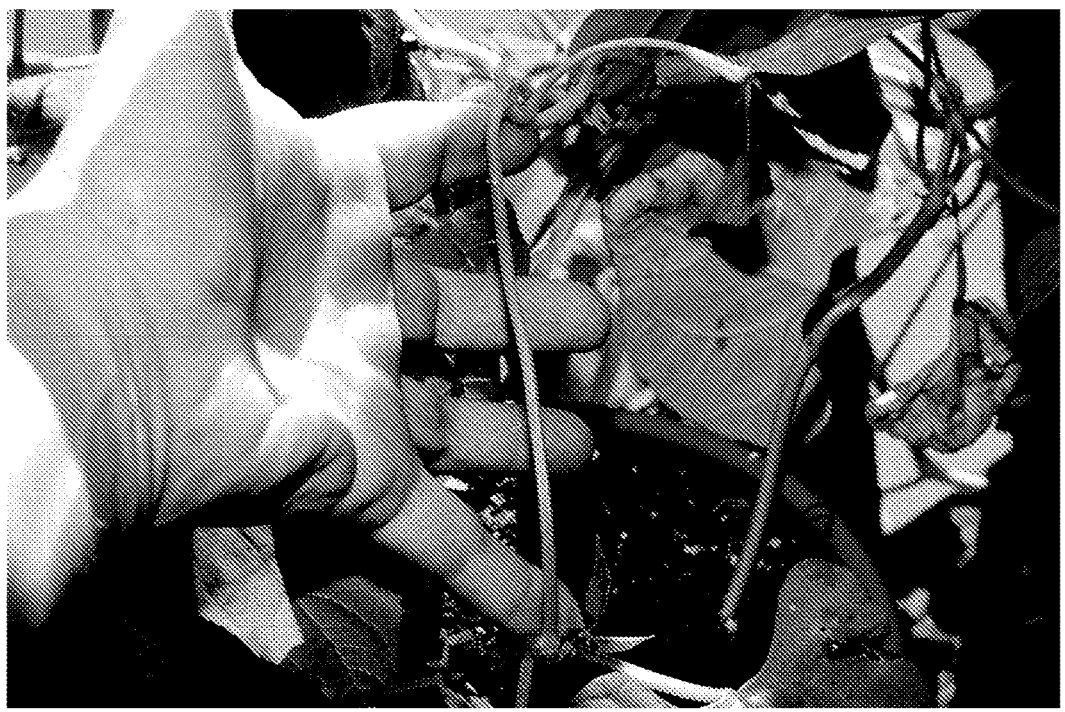
FIG. 9 is a photograph of a Kentucky Wonder pole bean plant grown under ambient light.
Figure 10:
FIG. 10 is a photograph of a Kentucky Wonder pole bean plant grown in accordance with the present disclosure.

FIG. 9 is a photograph of a Kentucky Wonder pole bean grown under ambient light, which has an internodal distance on the main stem of about six inches. FIG. 10 is a photograph of a Kentucky wonder pole bean grown using the method of the invention with blue LED light. The internodal distance is less than one inch. The grow times for the plants of FIGS. 9 and 10 were both six weeks, with the only difference being the lighting applied.

In addition to the above-described methods, it will be appreciated that the selective photomorphogenesis techniques or apparatuses can also be used in the following ways:

In a genetic engineering program
In a mutagen breeding program
In a conventional plant breeding program
In a plant protein research program.
In a gene research program.
In a plant signaling molecule research program.
In a plant morphogenesis research program.
In use or in conjunction with any sort of thigmomorphogenesis (touch) techniques. This includes any direct and indirect mechanical or touch stimulation to include sound waves.

In use or in conjunction with any chemical to include synthetic or natural plants hormones, growth inhibitors, growth enhancers and protein sprays applied to any part of a plant or the plant growth medium.

In use or in conjunction with any type of electrical, magnetic or electromagnetic fields to include direct and/or indirect stimulus of the plant or the plant's grow medium with said fields. These fields may be static, pulsed or of an arbitrary waveform.

In use or in conjunction with any sort of gravitropism techniques or research.

In use with LED grow lights or any other main grow light lighting source that contains no blue, violet or ultraviolet light (i.e., 500 nm and smaller light wavelength). It is the intention of this embodiment to cover the use of grow lights that are specifically designed to maximize cellular expansion with the use of any stem elongation reduction apparatus. For example, use of the lighting used to obtain the data in Table 1 with a sweet basil, combined with the use of pure amber LED grow light resulted in basil leaves four times larger than with direct illumination of a non-blue light source.

In addition to stem elongation reduction the embodiments are extended to the following plant structures: hypocotyl, epicotyl, cotyledon, coleoptile, petiole, leaf veins and other leaf structure, any part of the plant flowering structure, any part of the stem structure, and part of a fruit or a bean/pea pod or a legume, any part of the root system.

In use as a "rack system" where LEDs are built into a rack like structure where multiple plants may be grown. It's the intention of this to allow a lighting system with reduced wiring of the many LED light sticks that would be needed.

In use or built in to any sort of "flower pot" or any sort of plant growing system to include growing plants in soil or built into any sort of hydroponic-style system. This includes use of the selective photomorphogenesis apparatus and all peripheral structures to include wiring of the light source.

In one aspect, a method for inhibiting the length of a growing plant stem having a plurality of internodes is provided. In one embodiment, the method includes directly illuminating at least a portion of the plant stem with direct light focused on the portion of the plant stem, such that the portion of the stem is inhibited in growth.

In one embodiment, the portion of the plant stem directly illuminated is selected from the group consisting of the main stem, a side shoot of the main stem, and combinations thereof.

In one embodiment, directly illuminating the main stem comprises directly illuminating a portion of the main stem selected from the group consisting of the zone of elongation, the early zone of maturation, the zone of division, and combinations thereof.

In one embodiment, directly illuminating the side shoot of the main stem comprises directly illuminating a portion of the side shoot selected from the group consisting of the zone of elongation, the early zone of maturation, the zone of division, and combinations thereof.

In one embodiment, the direct light has a wavelength of from about 320 nm to about 760 nm.

In one embodiment, the direct light has a wavelength of from about 400 nm to about 450 nm.

In one embodiment, the direct light has a wavelength of from about 320 nm to about 400 nm.

In one embodiment, the direct light is produced by a light source selected from the group consisting of LEDs, electroluminescent strips, filtered fluorescent light, any other selective light source (i.e., a light source that can produce a specific wavelength range that is narrower than broad-spectrum light), and combinations thereof.

In one embodiment, the direct light is produced by an LED having a light beam pattern selected from the group consisting of an oval and a circle.

In one embodiment, directly illuminating comprises an unimpeded optical path between the light source and the plant stem.

In one embodiment, the plant is inhibited in growth by at least 50% as measured by the distance between internodes, compared to a plant grown without directly illuminating the plant stem.

In one embodiment, the plant is inhibited in growth by at least 75% as measured by the distance between internodes, compared to a plant grown without directly illuminating the plant stem.

In one embodiment, the plant is inhibited in growth by at least 90% as measured by the distance between internodes, compared to a plant grown without directly illuminating the plant stem.

In one embodiment, the plant stem is the stem of a plant selected from the group consisting of a monocotyledon plant and a dicotyledon plant.

In one embodiment, the plant is an apple tree.

In one embodiment, the plant is a tomato plant.

In one embodiment, the plant is a corn plant.

In one embodiment, the direct light does not impinge on leaves of the plant.

In one embodiment, the direct light is of a first wavelength during a first growing period of the plant stem and of a second wavelength during a second growing period of the plant stem.

In one embodiment, the direct light is generated within one inch of the plant stem.

In one embodiment, the direct light has an intensity of at least 100 µMol.

In one embodiment, the direct light has an intensity of at least 300 µMol.

In one embodiment, the direct light is provided by a blue LED array having a wavelength of from about 450 nm to about 500 nm and an intensity of at least 300 µMol.

In one embodiment, the method further comprises illuminating the plant with ambient lighting of a broad spectrum.

In one embodiment, the direct light is the only light source illuminating the portion of the plant stem.

In one embodiment, the direct light is not the only light source illuminating the portion of the plant stem.

In one embodiment, the method further comprises blocking light of a wavelength different from the wavelength of the direct light from reaching the plant and/or the portion of the stem illuminated by the direct light.

In another aspect, an apparatus for directly illuminating at least a portion of a growing plant stem is provided. In one embodiment, the apparatus includes:

(a) a light source configured to provide light of a specific wavelength range focused on a growing plant stem; and (b) an immobilizing structure configured to immobilize the light source structure in a user-specified position in relation to the portion of the growing plant stem.

In one embodiment, the light source is selected from the group consisting of LEDs, electroluminescent strips, filtered fluorescent light, any other selective light source, and combinations thereof.

In one embodiment, the immobilizing structure is a stake supporting the light source and configured to be placed in soil near the plant stem.

In one embodiment, the immobilizing structure attaches the light source directly to the plant stem.

In one embodiment, the immobilizing structure attaches the light source directly to a side shoot of the plant stem.

In one embodiment, the immobilizing structure is movable, so as to adjust the position of the light source in relation to the plant stem as the plant grows.

While illustrative embodiments have been illustrated and described, it will be appreciated that various changes can be made therein without departing from the spirit and scope of the invention.

The invention claimed is:

1. A method for inhibiting the length of a plant stem, comprising growing a plant having a plant stem while directly illuminating at least a portion of the plant stem with direct light focused on the portion of the plant stem, wherein the direct light has a wavelength of from about 320 nm to about 450 nm, and wherein the direct light is generated within one inch of the plant stem.

2. The method of claim 1, wherein the portion of the plant stem directly illuminated is selected from the group consisting of a main stem, a side shoot of the main stem, and combinations thereof.

3. The method of claim 2, wherein directly illuminating the main stem comprises directly illuminating a portion of the main stem selected from the group consisting of a zone of elongation, an early zone of maturation, a zone of division, and combinations thereof.

4. The method of claim 2, wherein directly illuminating the side shoot of the main stem comprises directly illuminating a portion of the side shoot selected from the group consisting of a zone of elongation, an early zone of maturation, a zone of division, and combinations thereof.

5. The method of claim 1, wherein the direct light is produced by a light source selected from the group consisting of LEDs, electroluminescent strips, filtered fluorescent light, any other selective light source, and combinations thereof.

6. The method of claim 1, wherein directly illuminating comprises an unimpeded optical path between the light source and the plant stem.

7. The method of claim 1, wherein the plant stem is the stem of a plant selected from the group consisting of a monocotyledon plant and a dicotyledon plant.

8. The method of claim 7, wherein the plant is an apple tree.

9. The method of claim 7, wherein the plant is a tomato plant.

10. The method of claim 7, wherein the plant is a corn plant.

11. The method of claim 1, wherein the direct light does not impinge on leaves of the plant.

12. The method of claim 1, wherein the direct light is the only light source illuminating the portion of the plant stem.

13. A method for growing a plant having a plant stem, comprising growing a plant having a plant stem while directly illuminating at least a portion of the plant stem with direct light focused on the portion of the plant stem, wherein the direct light has a wavelength of from about 320 nm to about 450 nm and wherein the direct light is generated within one inch of the plant stem.

14. The method of claim 13, wherein the portion of the plant stem directly illuminated is selected from the group consisting of a main stem, a side shoot of the main stem, and combinations thereof.

15. The method of claim 13, wherein the direct light is produced by a light source selected from the group consisting of LEDs, electroluminescent strips, filtered fluorescent light, any other selective light source, and combinations thereof.

16. The method of claim 13, wherein the plant stem is the stem of a plant selected from the group consisting of a monocotyledon plant and a dicotyledon plant.

17. The method of claim 13, wherein the plant is selected from the group consisting of an apple tree, tomato plant, and corn plant.

* * * * *